United States Patent
Kesler (10) Patent No.: US 7,511,545 B1
(45) Date of Patent: Mar. 31, 2009

(54) ANALOG DUTY CYCLE REPLICATING FREQUENCY CONVERTER FOR PWM SIGNALS

(75) Inventor: Scott B. Kesler, Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 7 days.

(21) Appl. No.: 11/900,768

(22) Filed: Sep. 13, 2007

(51) Int. Cl.
*H03K 3/017* (2006.01)
*H03K 5/04* (2006.01)
*H03K 7/08* (2006.01)

(52) U.S. Cl. .................. 327/175; 327/172; 327/184

(58) Field of Classification Search ............. 327/113, 327/172, 175, 184
See application file for complete search history.

(56) References Cited

U.S. PATENT DOCUMENTS

2002/0057116 A1* 5/2002 Kawano ............... 327/113

* cited by examiner

*Primary Examiner*—Lincoln Donovan
*Assistant Examiner*—John W Poos
(74) *Attorney, Agent, or Firm*—Jimmy L. Funke (57) ABSTRACT

An analog, duty cycle replicating frequency converter extracts duty cycle information from an input, pulse width modulated signal and generates an output pulse width modulated signal of the same duty cycle at a different frequency without regard to the frequency of the input signal. It uses bipolar transistor based circuitry, adaptable to an application specific integrated circuit, to derive voltages representing the on-time and period durations of the input signal, convert these voltages to currents representing the logarithms thereof, generate a voltage representing the difference between the currents, exponentially convert the voltage to a current representing the duty cycle and control an oscillator to generate an output pulse width modulated signal at a predetermined frequency with the duty cycle of the input signal.

16 Claims, 7 Drawing Sheets

ANALOG DUTY CYCLE REPLICATING FREQUENCY CONVERTER FOR PWM SIGNALS

TECHNICAL FIELD

The technical field of this invention is duty cycle replicating frequency converters for pulse width modulated (PWM) signals.

BACKGROUND OF THE INVENTION

Many electronically controlled systems use pulse width modulated (PWM) control systems. For example, modern electric motor control systems utilize pulse width modulated control signals to switch the motor drive power switching devices. Such control enhances motor efficiencies and can easily be generated by digital control systems. But, while typical motor drive control signal switching frequencies are typically in the range of 20 kHz to 30 kHz, the transmission of control signals with frequency components in this range may be undesirable from the perspective of the electromagnetic noise from inadequately shielded conductors, for example in lengthy runs of control signal cabling between the control and the motor. Many operating environments, such as automotive systems, have stringent requirements for the suppression of radiated noise in this and/or other frequency bands. Such requirements mandate that the motor control information be transmitted at lower frequencies while still conveying the appropriate duty-cycle control information to the power switching electronics. Typically, the duty-cycle information is transmitted at substantially lower frequencies, often in the hundreds of Hertz range, with the subsequent need to shift the duty-cycle encoded information up to the higher frequency signals required for the actual motor control.

While this duty cycle replication at a higher frequency can be performed by digital signal sampling and processing techniques, the overhead of relatively high clock frequencies to maintain the required translation accuracy, along with the need for high level digital content, has typically required implementation using microprocessors and associated signal processing electronics. This type of implementation also carries the need for filtered, regulated power supplies, and often in automotive applications the additional requirement of substantial transient voltage protection when located in remote locations on the vehicle. These requirements all add cost to the overall system.

SUMMARY OF THE INVENTION

This invention provides an analog, duty cycle replicating frequency converter capable of extracting duty cycle information from an input, pulse width modulated signal and generating an output pulse width modulated signal of the same duty cycle at a predetermined frequency, regardless of the frequency of the input signal. The converter of the invention uses analog signal processing techniques to allow implementation using application-specific integrated circuits (ASICs) fabricated in lower cost silicon processes. These dedicated ASICs can substantially reduce the system cost by reducing or eliminating the need for supply regulation and protection normally required for microprocessor based digital systems. Additionally, the overall system complexity is substantially reduced by use of a dedicated function control IC capable of driving the power switching devices of the motor control directly. The analog signal processing techniques comprising this invention are adaptable "on-the-fly" to varying input signal frequencies, allowing a single ASIC design to be widely applicable to various overall motor control systems where the duty-cycle information may be transmitted at different frequencies.

The analog duty cycle replicating frequency converter of the invention includes an input for receiving an input signal having an electrical characteristic varying at a first frequency between a first pair of values with a variable duty cycle, a first time/voltage (time-to-voltage) converter providing an output voltage representing a portion of a period of the input signal in which the electrical characteristic has a predetermined one of the two values and a first voltage responsive logarithmic current source coupled to receive the output voltage of the first time/voltage converter and provide a first current representing a logarithm of the portion of a period of the input signal in which the electrical characteristic has the predetermined one of the two values. It further includes a second time/voltage (time-to-voltage) converter providing an output voltage representing the period of the input signal, a second voltage responsive logarithmic current source coupled to receive the output voltage of the second time/voltage converter and provide a second current representing a logarithm of the period of the input signal and a current difference responsive voltage source coupled to the first and second voltage responsive logarithmic current sources and adapted to generate an output voltage representing a difference between the first and second currents and thus a logarithm of the duty cycle of the input signal. It further includes an exponential voltage/current (voltage-to-current) converter coupled to receive the output voltage of the current difference responsive voltage source and generate a third current exponentially derived therefrom and thus representing the duty cycle of the input signal and an oscillator responsive to the third current to generate an output signal having an electrical characteristic varying at a second frequency between a second pair of values with the duty cycle of the input signal.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
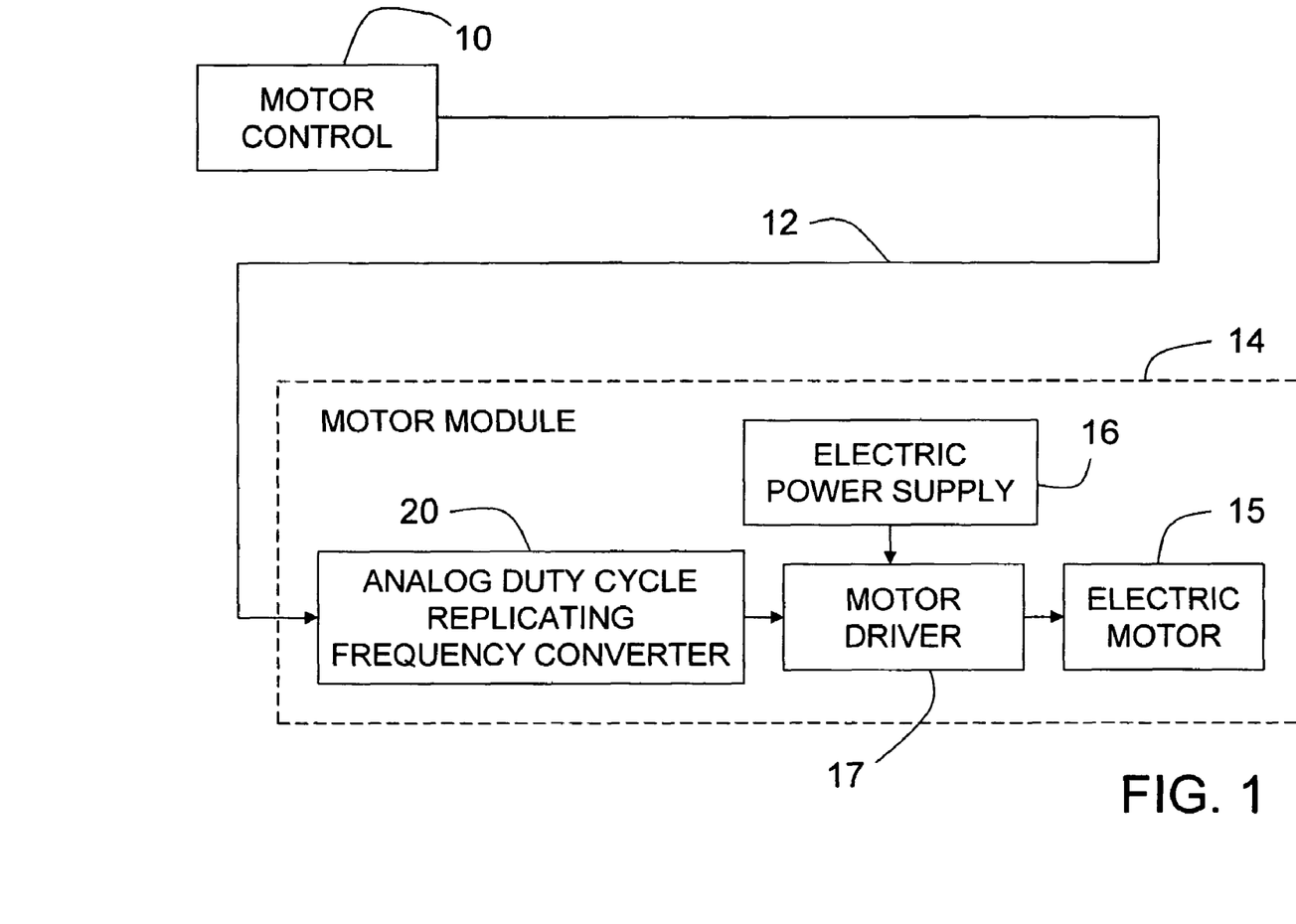
FIG. 1 is a block diagram of a motor control system including an analog duty cycle replicating frequency converter according to the invention.

The preferred embodiment of the invention will be described in the environment of a motor control system, although it is not limited to such an environment. FIG. 1 is a block diagram of a motor control system in which a motor control 10 provides a control signal through an electrical control line 12 to a motor module 14. The details of motor control 10 are not significant to this invention, except that the control signal it produces on control line 12 has a pulse width modulated (PWM) electrical characteristic such as voltage with a comparatively low frequency, for example within a range of 100-400 Hz, so that control line 12 does not radiate undesirable electromagnetic interference to nearby electromagnetically susceptible devices. In one of many possible such motor control systems, motor control 10 may include an engine fuel control of a motor vehicle, while motor module 14 may be an electric motor driven fuel pump module in the vehicle fuel tank remotely located with respect to motor control 10 but controlled by the engine fuel control through control line 12. Module 14 includes an electric motor 15, an electric power supply 16 and an electric motor driver circuit 17 of known construction that receives the signal from control line 12 and controls the application of electric power from power supply 16 to motor 15 responsive to a control signal provided thereto. The signal might, for example, control one or more driver transistors to switch the power supply across a part of the motor such as its armature with the duty cycle of the control signal to control the average voltage applied to motor 15 and thus the motor's speed and the pump's pumping rate.

In order to provide optimal electric power application to motor 15, an analog duty cycle replicating frequency converter 20 according to this invention is included in motor module 14. Converter 20 receives the signal received from motor control 10 on line 12, derives a signal representing its duty cycle and generates an output signal having the same duty cycle as that of the input signal at a frequency predetermined for efficient motor control, without regard for the frequency of the input signal. For example, the output signal from analog duty cycle replicating frequency converter 20 may have a frequency within the range of 20-30 KHz.

Figure 2:
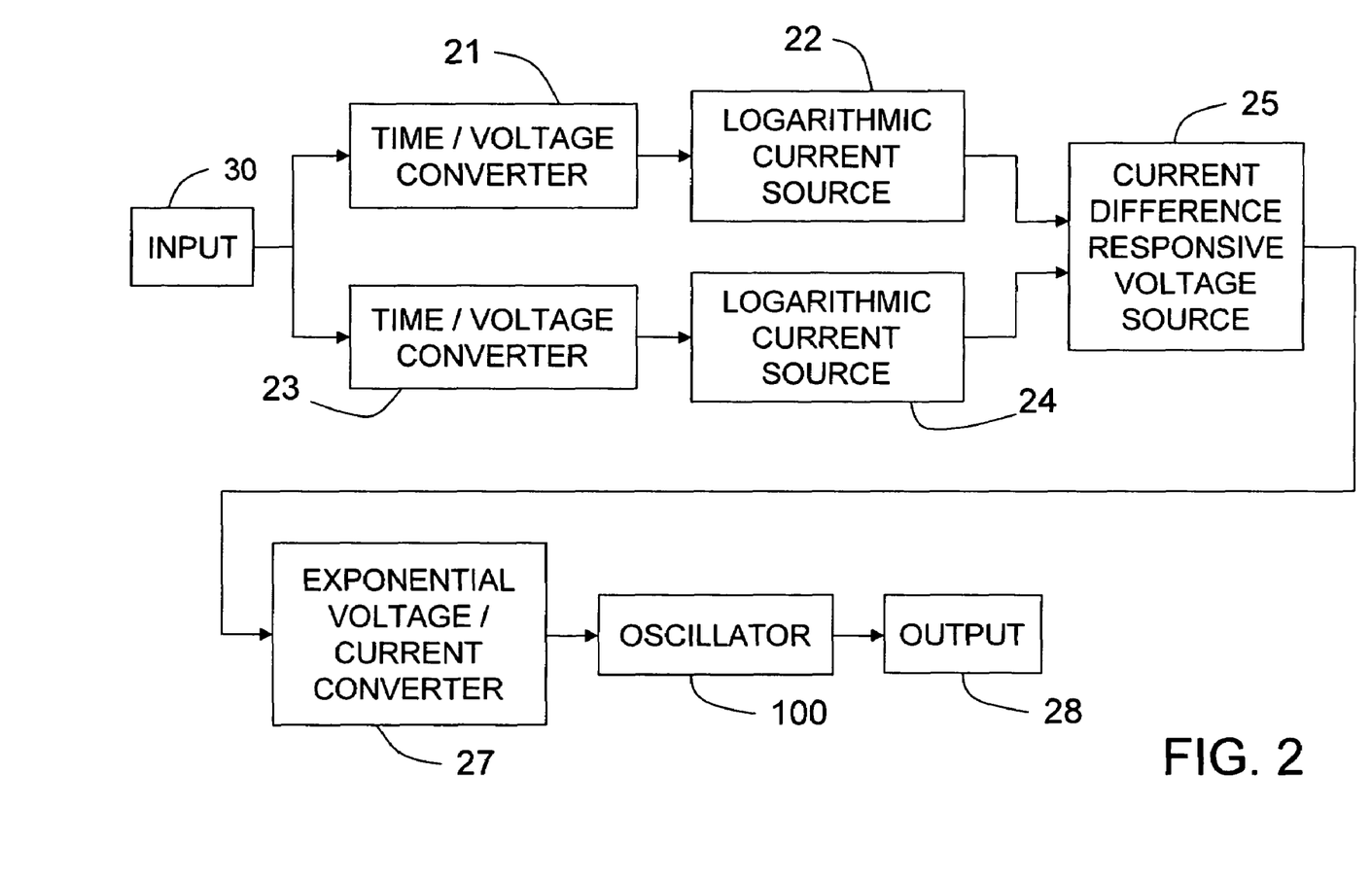
FIG. 2 is a block diagram of an analog duty cycle replicating frequency converter according to the invention

FIG. 2 shows a block diagram of analog duty cycle replicating frequency converter 20. A control signal having an electrical characteristic, such as voltage, varying between two predetermined values at a transmission frequency, for example in a range of 100-400 Hz, is received at an input 30, for example from control line 12 as shown in FIG. 1. This control signal, which is an input signal to analog duty cycle replicating frequency converter 20, is applied to a time/voltage (time-to-voltage) converter 21, which generates a voltage representing the time duration in which the control signal voltage remains at one of the two predetermined levels (herein defined as the on-time) during a cycle of the control signal and holds this voltage for processing. Likewise, the control signal is applied in parallel to a similar time/voltage (time-to-voltage) converter 23 that similarly generates and holds a voltage representing the duration of the corresponding period of the control signal. Each of the voltages so generated is provided to a separate one of logarithmic current sources 22 and 24, respectively; and each of the logarithmic current sources 22 and 24 outputs a current representing a logarithm, such as the natural logarithm (to the base "e"), of the applied voltage to a current difference responsive voltage source 25. Since one of the currents represents the logarithm of the on-time of the signal and the other represents the logarithm of the period in which the on-time occurred, their arithmetic difference represents the logarithm of their ratio—which is by definition the logarithm of the duty cycle of the signal during the measured period. Thus, current difference responsive voltage source 25 generates a difference current and converts this difference current linearly to an output voltage representing the logarithm of the duty cycle of the input signal during the measured period. The output of current difference responsive voltage source 25 is provided to an exponential voltage/current converter 27, which provides an output current that is an exponential function of its input voltage. That is, the output of exponential voltage/current converter 27 represents a value equal to the base (such as the base "e" of natural logarithms) raised to a power equal to the value of the input of exponential voltage/current converter 27. The output of exponential voltage/current (voltage-to-current) converter 27 thus represents the duty cycle of the control signal input to analog duty cycle replicating frequency converter 20. The output of exponential voltage/current converter 27 is provided to an oscillator 100 as a duty cycle control signal; and oscillator 100 provides a control signal at an output 28 that has a separately determined frequency but with the same duty cycle as the input control signal.

Figure 3:
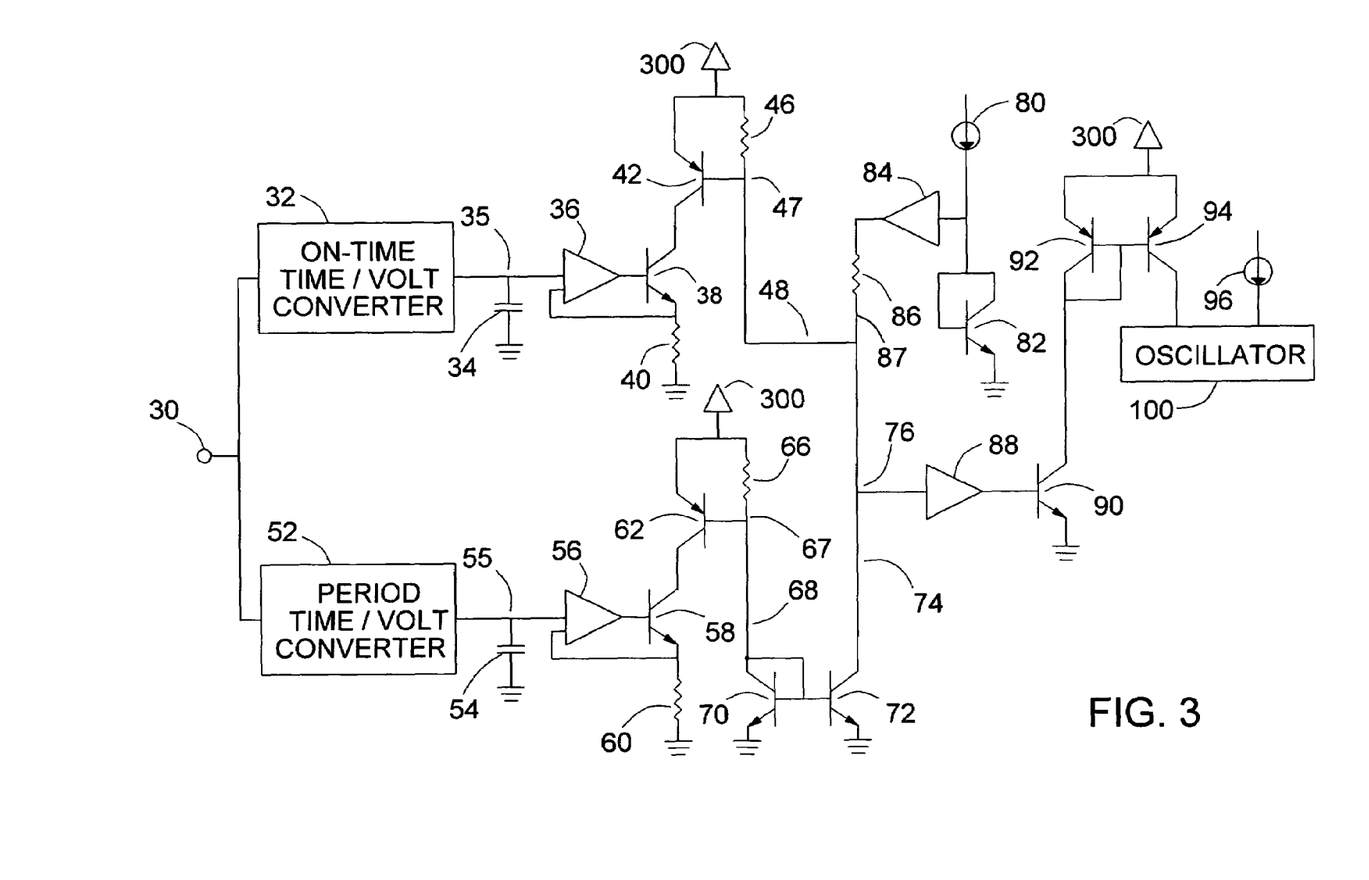
FIG. 3 is a basic combined circuit and block diagram of an embodiment of an analog duty cycle replicating frequency converter according to the invention.

FIG. 3 is a basic combined block and circuit diagram of the analog duty cycle replicating frequency converter of this invention. In this example, it is shown as an application specific integrated circuit (ASIC) using bipolar transistor technology; but the invention is not restricted to bipolar technology except for certain transistors (42, 62, 82, 90) as will be discussed below. Other parts of the circuit may be constructed with any other suitable technology, for example bipolar, MOS or mixed. This embodiment receives at its input 30 a PWM voltage signal with a variable duty cycle at a lower frequency (e.g. 100-400 Hz) and outputs a PWM voltage signal with the same duty cycle but at a higher frequency (e.g. 20-30 KHz).

The input signal received on input 30 is provided to both an on-time time/voltage converter 32 and a period time/voltage converter 52. Each of these converters is a charge accumulating circuit of the type, known in the art, that applies a charging current to a capacitor at a constant rate during a controlled time period so that the voltage on the capacitor at the end of the charging time varies linearly with the time duration of the period. Time/voltage converter 32 is allowed to charge during the on-time of a period of the input signal, while period time/voltage converter 52 is allowed to charge at the same constant rate for the full duration of the same period. Thus at the end of a period of the input signal, converter 32 stores a voltage $V_{ON}$ that is proportional to the on-time of the period and converter 52 stores a voltage ($V_{PER}$) that is proportional to the full duration of the period. The circuits are matched in construction so that the ratio ($V_{ON}/V_{PER}$) of these voltages indicates the PWM duty cycle, independently of the length of the period.

At the end of a period, the voltage from on-time time/voltage converter 32 is transferred to a hold capacitor 34; and then converter 32 is isolated from capacitor 34. The latter action frees converter 32 to operate during the next period while the accumulated voltage $V_{ON}$—which represents the on-time of the period—is held on capacitor 34. On-time time/voltage converter 32 and capacitor 34 thus correspond to time/voltage converter 21 of FIG. 2. Similarly, at the end of the same period, the voltage from period time/voltage converter 52 is transferred to a hold capacitor 54; and then converter 52 is isolated from capacitor 54. The latter action frees converter 52 to operate during the next period while the accumulated voltage $V_{PER}$—which represents the duration of the period—is held on capacitor 54. Period time/voltage converter 52 and capacitor 54 thus correspond to time/voltage converter 23 of FIG. 2.

Node 35, the junction of on-time time/voltage converter 32 and capacitor 34 on which appears voltage $V_{ON}$, is connected through a unity gain (1:1) amplifier 36 to the base of an NPN transistor 38, which has an emitter connected to ground through a resistor 40 and a collector connected through the collector and emitter of a PNP transistor 42 to a positive voltage supply 300. A resistor 46 is connected across the base-emitter junction of PNP transistor 42, and junction 47 of resistor 46 and the base of PNP transistor 42 is also connected to a conducting line 48.

In operation, voltage $V_{ON}$ on capacitor 34 is applied through unity gain amplifier 36 to the base of NPN transistor 38, which provides a collector current $I_{CON}=V_{ON}/R$ that is proportional thereto and thus to the on-time duration of the period. The same collector current is forced to flow in the collector of PNP transistor 42, which is connected in series with it. The base-emitter voltage Vbe of PNP transistor 42 varies as the logarithm of its forced collector current $I_{CON}$, as described in the equation $Vbe=Vt \times ln(I_{CON}/I_S)$, wherein $ln(x)$ is the natural logarithm of the quantity in parentheses, $I_S$ is the saturation current as understood from device modelling and Vt is the thermal voltage, defined as $Vt=(k \times T)/q$, wherein k is Boltzmann's constant, T is temperature in degrees Kelvin and q is the electronic charge. This base-emitter voltage of transistor 42 is applied across resistor 46; and the current $I_{ON}$ through resistor 46 and on line 48 thus has a value representing the natural logarithm of the on-time of the period: $I_{ON}=Vt/R \times ln(I_{CON}/I_S)$. A bipolar transistor is used for transistor 42 to make use of its logarithmic collector current to Vbe relationship. This circuit of elements 38-48 corresponds to the logarithmic current source 22 of FIG. 2, with transistor 42 performing the logarithmic conversion between its collector current and its base-emitter voltage.

Likewise, the voltage $V_{PER}$ on node 55—the junction of period time/voltage converter 52 and capacitor 54—is applied through a unity gain (1:1) amplifier 56 to the base of an NPN transistor 58 having an emitter connected to ground through a resistor 60 and a collector connected through the collector and emitter of a PNP transistor 62 to positive voltage supply 300. A resistor 66 is connected across the base-emitter junction of transistor 62. Junction 67 of resistor 66 and the base of transistor 62 is connected to a conducting line 68. The construction and properties of the circuit elements 58-68 are matched as closely as possible with those of corresponding elements 38-48. In a manner similar to that described above for elements 38 through 48, circuit elements 58 through 68 produce a current $I_{PER}$ in line 68 having a value representing the logarithm of the full duration of the period. This circuit of elements 58-68 corresponds to the logarithmic current source 24 of FIG. 2, with transistor 62 performing the logarithmic conversion. A bipolar transistor is used for transistor 62 to make use of its logarithmic collector current to Vbe relationship. In addition, the physical characteristics of transistors 42 and 62, as well as those of resistors 46 and 66, are matched as closely as possible.

The currents in lines 48 and 68 are provided to a current difference responsive voltage generator. Junction 67 of resistor 66 and the base of PNP transistor 62 is connected through conducting line 68 to the collector of a diode-connected NPN transistor 70 connected in a current mirror configuration with an NPN transistor 72. The collector of transistor 72 is connected through a conducting line 74 to conducting line 48 at a node 76. A reference current generator 80 provides a reference current $I_{REF}$ to ground through a diode-connected bipolar NPN transistor 82 (an NPN transistor having its collector connected to its base. The purpose of transistor 82 is to generate a reference base-emitter voltage Vbe; and it is thus preferably a bipolar transistor or its equivalent. Transistor 82 is diode connected in this circuit; but this is not generally required, as will be seen in the circuit of FIGS. 6A-6C described below. The reference base-emitter voltage Vbe of transistor 82 is applied through a follower 84 and a series resistor 86 in a conducting line 87 to node 76. Resistor 86 acts as a linear current/voltage converter; and conducting lines 48, 74 and 87 together act as a current difference circuit. Since the on-time of a period in a PWM waveform can never be longer than the full duration of the period, the current in conducting line 48 representing the logarithm of the on-time of the period and flowing into node 76 can never be greater than the current in conducting line 74 representing the logarithm of the full duration of the period. The larger (period time) current forced in line 74 by transistor 72 of the current mirror thus generally requires more than that provided by the smaller (on-time) current provided on line 48, and the difference is provided by the power supply connections (not shown in this Figure) of follower 84 through resistor 86. The current through resistor 86 is the difference between the current in line 74 and the current in line 48 and thus represents the logarithm of the difference between the period and the on-time of the period, which is the logarithm of the duty cycle of the input signal This current difference is related to $V_N$, the voltage at node 76, in the following equation:

$$V_N=Vbe-R[I_{PER}-I_{ON}],$$

wherein Vbe is the base-emitter voltage of diode-connected transistor 82, R is the resistance of resistor 86, $I_{PER}$ is the current in conducting line 74 and $I_{ON}$ is the current in conducting line 48. Since $Vbe=Vt*ln(I_C/I_S)$, this equation may be expressed:

$$V_N=Vt*ln(I_{REF}/I_S)-R[I_{PER}-I_{ON}]$$

Since the values of resistors 46, 66 and 86 are equal, $$V_N=Vt*ln(I_{REF}/I_S)-R[(Vt*ln(I_{PER}/I_S))/R-(Vt*ln(I_{ON}/I_S))/R].$$

Since $ln(x)-ln(y)=ln(x/y)$, $$V_N=Vt*ln(I_{REF}/I_S)-Vt*ln[(I_{PER}/I_S)/(I_{ON}/I_S)], \text{ or}$$

$$V_N=Vt*ln[(I_{REF}/I_S)*(I_{ON}/I_{PER})].$$

If the duty cycle of the input control signal is 100 percent, $I_{PER}=I_{ON}$; and $V_N$ is equal to the reference Vbe set in transistor 82. As the duty cycle decreases from 100 percent, voltage $V_N$ at node 76 decreases from the reference Vbe set in transistor 82. Thus, the voltage at node 76 indicates the logarithm of the duty cycle of the input signal; and elements 70-86 essentially comprise the current difference responsive voltage source 25 of FIG. 2.

Node 76 is connected through a follower 88 to apply the voltage thereon across the base-emitter junction of an NPN transistor 90, the collector current of which will thus be exponentially related to the voltage at node 76. A bipolar transistor is used for transistor 90 because of its exponential Vbe-to-collector current conversion. In addition, the physical characteristics of transistors 90 and 82 are matched as closely as possible. The collector current $I_C$ of transistor 90 is related to its base-emitter voltage Vbe by the following equation:

$$I_C=I_S*exp(Vbe/V_T)$$

The voltage applied across the emitter-base junction of transistor 90 is the voltage $V_N$ on node 76. When this voltage is substituted for Vbe in the equation for $I_C$ above, the result is:

$$I_C=I_S*exp[Vt*ln(I_{REF}/I_S*I_{ON}/I_{PER})/Vt]$$

This reduces to:

$$I_C=I_{REF}*(I_{ON}/I_{PER})$$

Since $I_{REF}$ is constant, the collector current $I_C$ of transistor 90 is proportional to the ratio of the currents in lines 48 and 68.

The exponential function performed in transistor 90 is the inverse of the logarithmic function of transistors 42 and 62, which determined the logarithms of the on-duration and total period duration of the input signal; and the collector current $I_C$ of transistor 90 is proportional to the duty cycle of the input signal.

The collector of NPN transistor 90 is connected in series with a PNP transistor 92 forming a current mirror with a PNP transistor 94. Elements 88-94 thus comprise the exponential voltage/current converter 27 of FIG. 2. The mirrored collector current in PNP transistor 94 is provided to oscillator 100 to produce a high frequency voltage signal having the same duty signal as the input signal. A current $I_{REF}$ equal to that provided by current source 80 is provided by current source 96 to oscillator 100 as a reference current, as will be explained in more detail below in the description of oscillator 100 (FIG. 4) and the description of reference current generator 245 (FIG. 6B). Transistor 90, together with follower 88 and the current mirror of transistor 92 and 94, correspond to exponential voltage/current converter 27 of FIG. 2.

Figure 4:
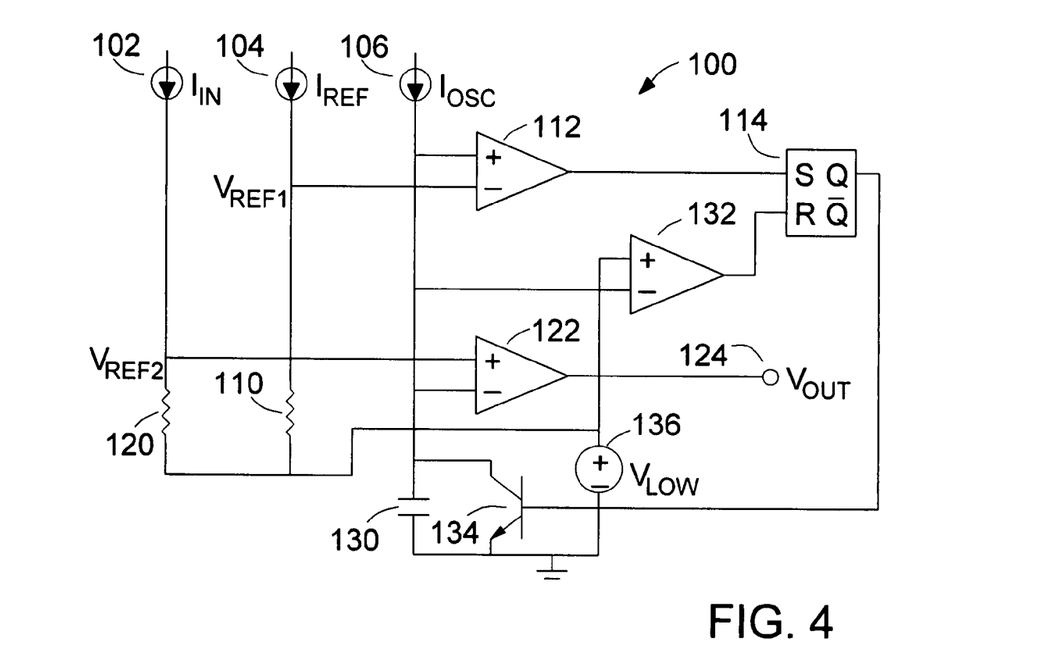
FIG. 4 is a circuit diagram of an oscillator for use in the analog duty cycle replicating frequency converter shown in FIG. 3.

An example basic oscillator circuit 100 for use in the apparatus of FIG. 3 is shown in FIG. 4. Oscillator 100 is shown with three current inputs, shown as current generators for convenience. Current generator 102 represents the output control signal in the circuit of FIG. 3, specifically the collector current of transistor 94, but labeled $I_{IN}$ in FIG. 4. Current generator 104 is the reference current $I_{REF}$ from reference current generator 96 of FIG. 3 that is equal to that provided by reference current generator 80 of FIG. 3. Current generator 106 generates a current for control of the frequency of oscillator 100, as will be further described below.

Current $I_{REF}$ from current generator 104 is provided through a resistor 110 to a voltage $V_{LOW}$ above ground that is developed by a voltage generator 136. Resistor 110 carrying current $I_{REF}$ generates a voltage $V_{REF1}$ on the inverting input of a comparator 112, which has an output connected to the set input of a bistable circuit (flip-flop) 114. Current $I_{IN}$ from current generator 102 is provided through a resistor 120 to voltage $V_{LOW}$ above ground generated by voltage generator 136. Resistor 120 carrying current $I_{IN}$ generates a voltage $V_{REF2}$ on the non-inverting input of a comparator 122, the output of which is connected to the output terminal of the oscillator. Current from current generator 106 provides a charging current $I_{OSC}$ to a capacitor 130. The voltage across capacitor 130, referenced to ground, is applied to the non-inverting input of comparator 112, the inverting input of comparator 122, and the inverting input of a comparator 132 having an output connected to the reset input of flip-flop 114. Voltage source 136 provides a reference voltage $V_{LOW}$ to the non-inverting input of comparator 132; and an NPN transistor has emitter and collector connected across capacitor 134 and a base connected to the Q output of flip-flop 114.

Figure 5:
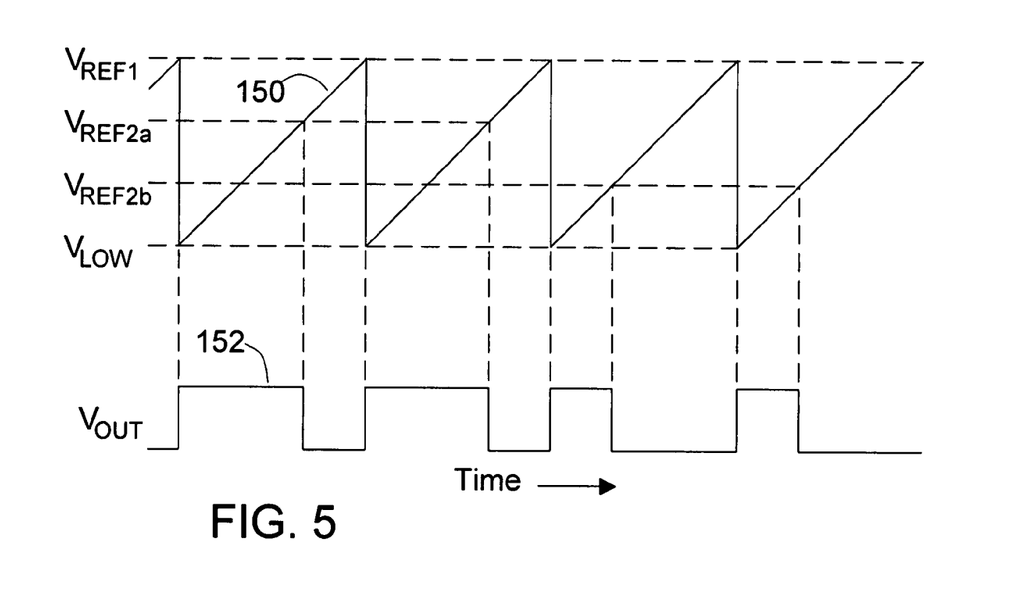
FIG. 5 shows a plurality of time-coordinated waveforms illustrating the operation of the oscillator of FIG. 4.

In operation, oscillator 100 of FIG. 3 is driven by current $I_{OSC}$ charging capacitor 130. With transistor 134 not conducting, the voltage across capacitor 130 is allowed to increase at a predetermined rate set by $I_{OSC}$ and the capacitance of capacitor 130; and the capacitor is quickly discharged when transistor 134 is turned on to begin each new oscillator cycle. Each of the comparators 112, 122 and 132 performs a specific function in this cyclical operation as the voltage on capacitor 130 ramps upward and drops as shown in waveform 150 of FIG. 5.

Comparator 132 begins the rising capacitor voltage portion of each oscillator cycle. Assuming that flip-flop 114 is set and transistor 134 is thus turned on, when the rapidly falling voltage on capacitor 130 reaches voltage $V_{LOW}$ defined by voltage source 136, comparator 132 switches to a high output, which is applied to the reset input of flip-flop 114. Voltage $V_{LOW}$ is set lower than $V_{REF1}$; and comparator 112 has a low output at this moment. Thus flip-flop 114 switches off its output (Q) and allows transistor 134 to turn off. This frees capacitor 130 to begin charging. Thus each rising portion of waveform 150 in FIG. 4 is initiated by comparator 132 switching to a high output.

Comparator 112 ends each oscillator cycle. When the increasing voltage across the charging capacitor 130 reaches voltage $V_{REF1}$, comparator 112 switches from a low output to a high output applied to the set input of flip-flop 114; and flip-flop 114 switches its output (Q) on to turn on transistor 134 and immediately discharge capacitor 130 to voltage $V_{LOW}$. In FIG. 4, this discharge of capacitor 130 is shown in each almost vertical drop of waveform 150. Comparators 132 and 112 together thus provide oscillator action with a period that is set by the circuit parameters of the oscillator and currents $I_{REF}$ and $I_{OSC}$, independently of the period of the input signal to terminal 30 of the circuit of FIG. 1. For example, in a motor vehicle environment, the oscillator output on terminal 124 may be at a frequency of 20 KHz to 30 KHz typical of electric motor controls, whereas the input signal to terminal 30 of FIG. 1 may be on the order of 100 to 400 Hz to minimize the radiation of electromagnetic interference to other systems from any connecting lines between the motor package and a controlling computer providing the duty cycle control signal.

Comparator 122 controls the duty cycle of the oscillator output signal on terminal 124, which output signal is seen in waveform 152 of FIG. 4. Voltage $V_{REF2}$ is determined by the resistance of resistor 120 and the value of current $I_{IN}$, which represents the duty cycle of the original signal on input 30 of the circuit of FIG. 1. The oscillator circuit parameters are designed so that voltage $V_{REF2}$ is always within a range limited by $V_{REF1}$ and $V_{LOW}$. Thus, at the beginning of each cycle, when the voltage on capacitor 130 is equal to $V_{LOW}$, comparator 122 will produce a high output due to the higher value of $V_{REF2}$. The voltage on output terminal 124 will be high and will stay high until the rising voltage on capacitor 130 reaches $V_{REF2}$, at which point it will go low and stay low while the voltage on capacitor 130 continues to rise toward $V_{REF1}$. Only when the voltage on capacitor 130 reaches $V_{REF1}$ will the cycle end, as previously described, with transistor quickly discharging capacitor 130. If voltage $V_{REF2}$ is close to voltage $V_{REF1}$—due to a high duty cycle in the input signal applied to terminal 30 and thus a high value of $V_{IN}$ to the oscillator 100—output $V_{OUT}$ of oscillator 100 will stay high for a large portion of the capacitor 130 voltage ramp-up to $V_{REF1}$; and the duty cycle of $V_{OUT}$ will likewise be high, as seen in the first two pulses of waveform 152 in FIG. 5 in which $V_{REF2=VREF2A}$ and in which the higher signal valued portion of the cycle is greater in duration than the lower signal valued portion. On the other hand, a low duty cycle of the input signal to terminal 30 will produce a low value of VIN to oscillator 100, a low value ($V_{REF2B}$) of $V_{REF2}$ compared to $V_{REF1}$ and a low duty cycle of $V_{OUT}$, as seen in the third and fourth pulses of waveform 152 in FIG. 5 in which the lower valued signal portion of the cycle is smaller in duration than the higher valued signal portion.

It was previously stated that current $I_{IN}$, which determines the value of $V_{REF1}$ and thus the period duration of the output duty cycle, is equal to the collector current $I_C$ of transistor 90. That is:

$$I_{IN}=I_C=I_{REF}*(I_{ON}/I_{PER}),$$

wherein ($I_{ON}/I_{PER}$) represents the duty cycle of the input control signal. By dividing each side by $I_{REF}$, This can also be written:

$$(I_{IN}/I_{REF})=(I_{ON}/I_{PER}).$$

Assuming that resistors 110 and 120 have the same resistance R, $$V_{REF2}-V_{LOW}=I_{IN}*R, \text{ and}$$

$$V_{REF1}-V_{LOW}=I_{REF}*R. \text{ Thus}$$

$$(I_{ON}/I_{PER})=(I_{IN}/I_{REF})=(V_{REF2}-V_{LOW})/(V_{REF1}-V_{LOW}).$$

In each period or cycle of oscillator 100, the voltage on capacitor 130 increases from $V_{LOW}$ to $V_{REF2}$ during the on-time of the cycle and from $V_{LOW}$ to $V_{REF1}$ during the full period of the cycle. Thus, the ratio ($V_{REF2}-V_{LOW}$)/($V_{REF1}-V_{LOW}$) describes the duty cycle of the oscillator output; and the output duty of oscillator 100 equals the duty cycle of the control signal applied to input 30.

Figure 6A:
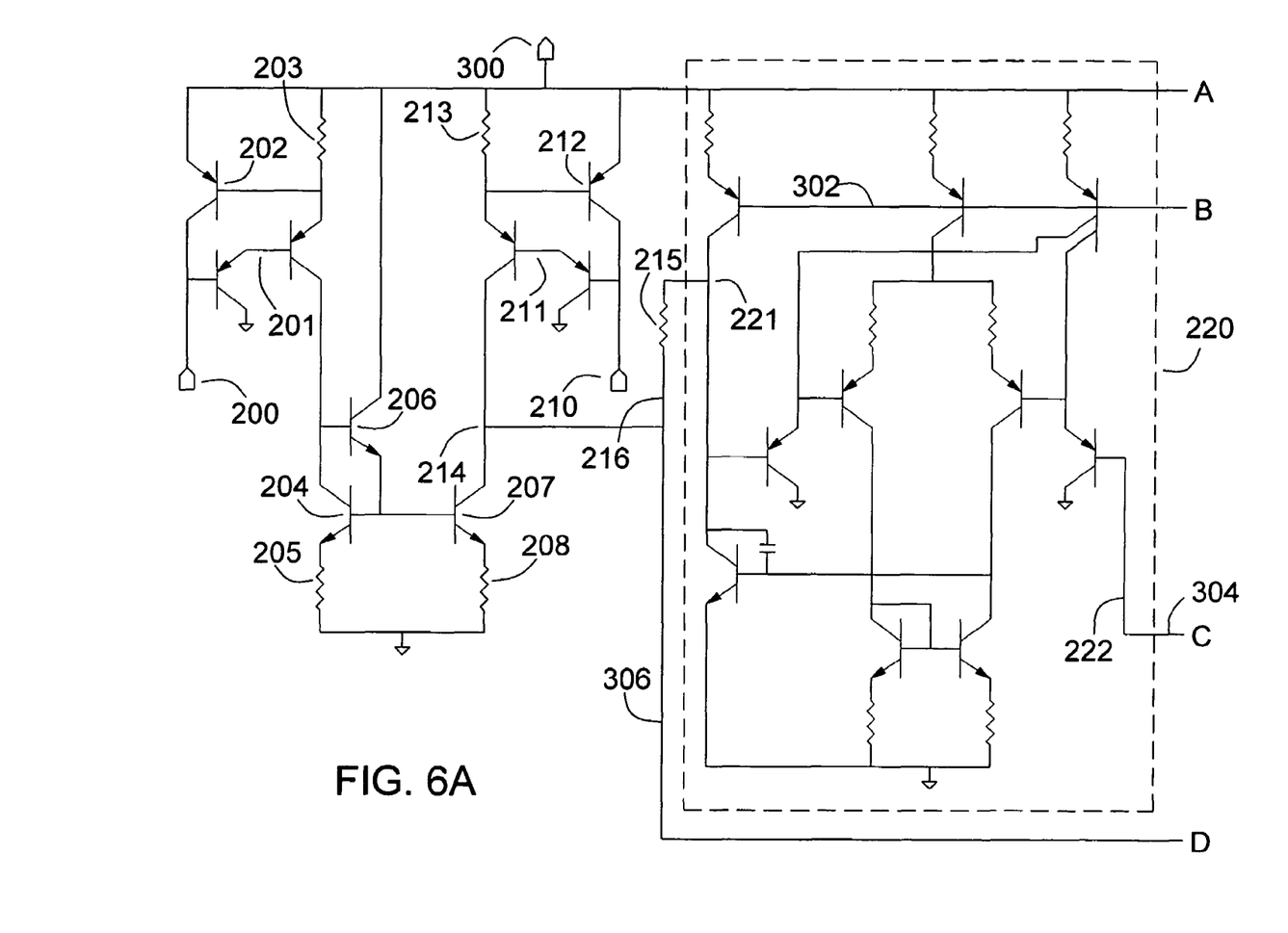
FIGS. 6A-6C together show a more complete circuit diagram of an embodiment corresponding to a portion of the embodiment shown in FIG. 3
Figure 6B:
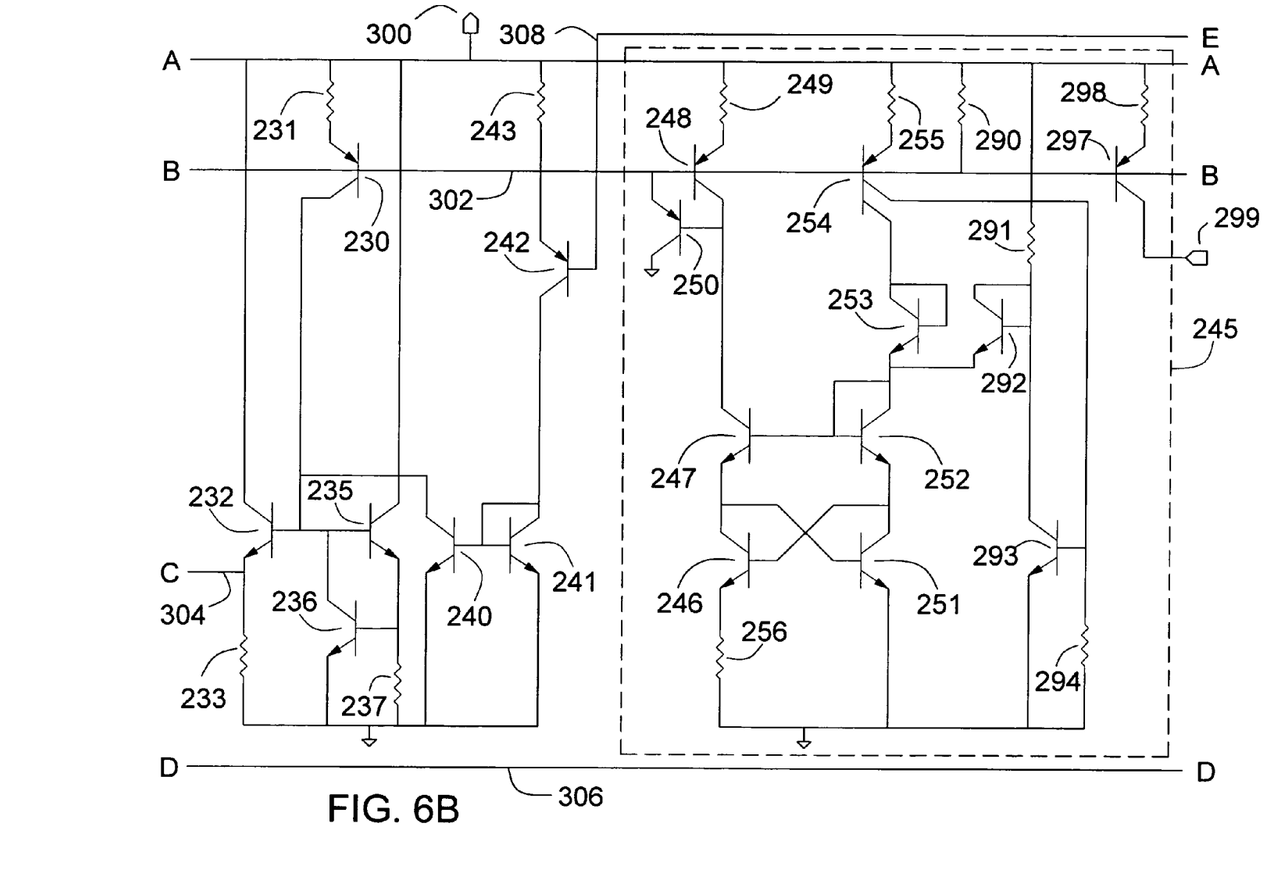
Figure 6C:
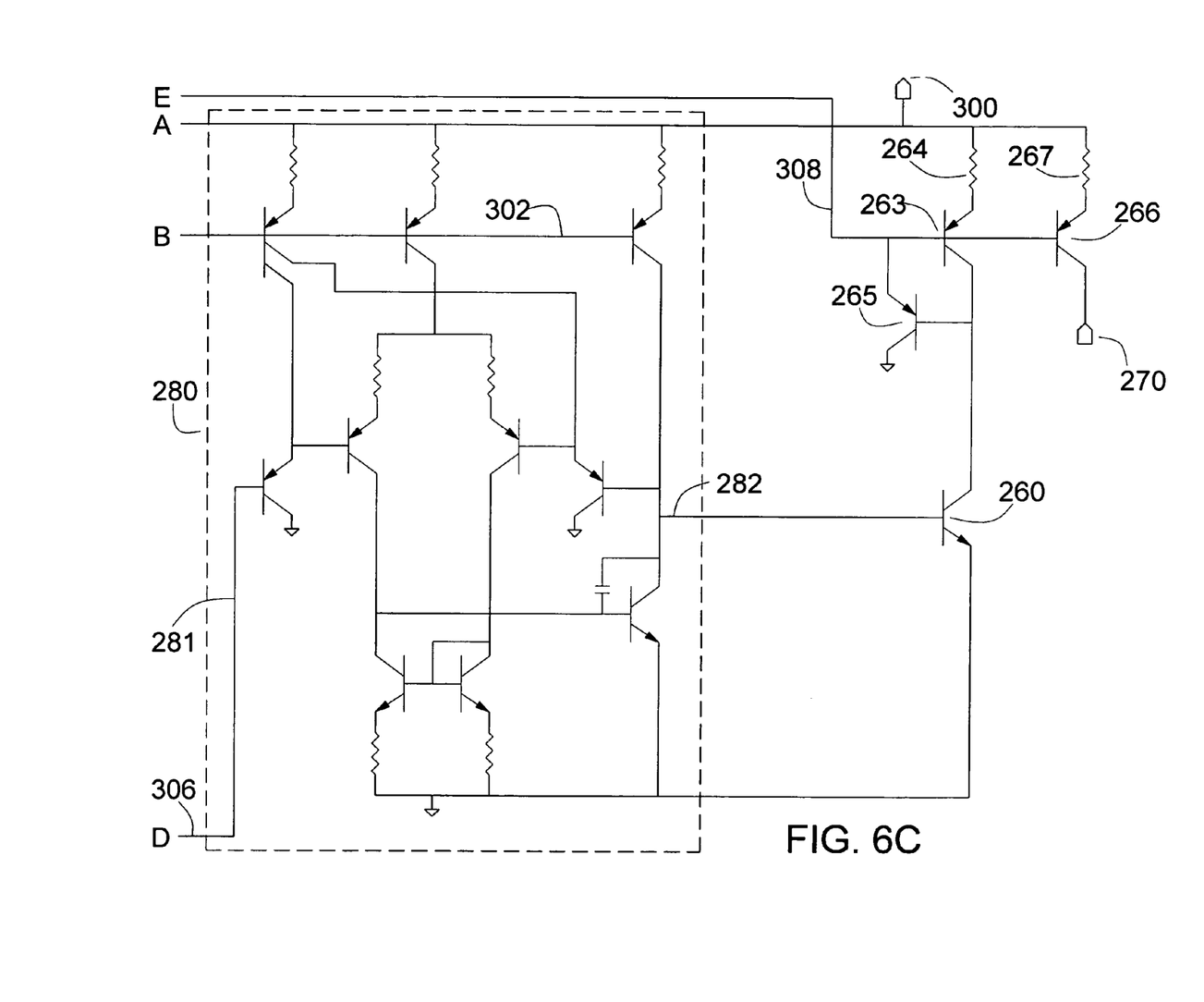

FIGS. 6A-6C show a more detailed circuit layout for an example Application Specific Integrated Circuit (ASIC) useful in the apparatus shown in FIG. 1. It corresponds to elements 42-48 and 62-94 of the apparatus of FIG. 3. Referring to FIG. 6A, input terminal 200 receives a current representing the period of the input signal, typically from the series connected collector of a transistor such as transistor 58 in FIG. 3 or an equivalent linear voltage responsive current source. Input terminal 200 is connected to the base of Darlington-connected NPN transistor pair 201 and to the collector of a PNP bipolar transistor 202 having an emitter connected to the positive supply 300. A resistor 203 is connected across the base-emitter junction of transistor 202; and NPN transistor pair 201 has its emitter connected to the base of transistor 202. A current is generated through resistor 203 and the emitter and ungrounded collector of NPN transistor pair 201 that is representative of the voltage drop across resistor 203. This voltage drop is equal to the base-emitter voltage Vbe of PNP transistor 202, which is representative of the logarithm of the collector current of transistor 202 provided through input terminal 200. Transistor 202 and resistor 203 perform the same logarithmic conversion of collector current to Vbe in the circuit of FIG. 6A as do transistor 62 and resistor 66 in the circuit of FIG. 3; and the output current of logarithmic current source 24 is thus provided from the ungrounded collector of Darlington-connected transistor pair 201.

The collector of Darlington-connected transistor pair 201 is connected in series through the collector and emitter of an NPN bipolar transistor 204 and a resistor 205 to ground. Transistor 204 forms the input of a current mirror further including an NPN bipolar transistor 206 with an emitter connected to the base of transistor 204, a base connected to the collector of transistor 204 and a collector connected to the positive supply 300. The output of the current mirror is the collector of an NPN bipolar transistor 207 having a base connected to the base of transistor 204 and an emitter connected through a resistor 208 to ground.

Input terminal 210 receives a current representing the on-time of the input signal, typically from the series connected collector of a transistor such as transistor 38 in FIG. 3 or an equivalent voltage responsive current source. Input 210 is connected to the base of Darlington-connected NPN transistor pair 211 and to the collector of a PNP bipolar transistor 212, which receives the current from input terminal 210 as its collector current. Transistor 212 has an emitter connected to the positive supply 300; and a resistor 213 is connected across its base-emitter junction. Darlington-connected NPN transistor pair 211 has its emitter connected to the base of transistor 212. A current is generated through resistor 213 and the emitter and ungrounded collector of NPN transistor pair 211 that is representative of the voltage drop across resistor 213. This voltage drop is equal to the Vbe of PNP transistor 212, which is representative of the logarithm of the collector current of transistor 212 provided through input terminal 210. Transistor 212 and resistor 213 perform the same logarithmic conversion of collector current to Vbe in the circuit of FIG. 6A as do transistor 42 and resistor 46 in the circuit of FIG. 3; and the output current of logarithmic current source 22 is thus provided from the ungrounded collector of Darlington-connected transistor pair 211.

The ungrounded collector of Darlington-connected NPN transistor pair 211 is connected to the collector of transistor 207 at a junction 214, which corresponds to junction 76 in the circuit of FIG. 3. Thus, a current flows into junction 214 from Darlington-connected transistor pair 211 representing the logarithm of the current applied to input terminal 210, which current represents the on-time of the duty cycle of the control signal on line 12; and a current flows out of junction 214 into the collector of transistor 207 of the current mirror, which current represents the logarithm of the current applied to input 200 and thus the period of the duty cycle of the control signal on line 12. A current is required to make up the difference in these currents at junction 214; and this current ($I_{PER}-I_{ON}$) is provided on a conducting line 216 through a resistor 215, corresponding to line 87 and resistor 86, respectively, in the circuit of FIG. 3, from a voltage follower 220, which corresponds to voltage follower 84 in the circuit of FIG. 3. The ungrounded collector of Darlington-connected transistor pair 211, the collector of transistor 207 and line 216 including resistor 215 comprise a current difference circuit with a node 214 corresponding to lines 48, 74 and 87 with resistor 86 and node 76 of FIG. 3. Voltage follower 220 is a voltage follower circuit of standard construction in which the output voltage provided to the connected end of resistor 215 is equal to an input voltage provided from line 304 (the connections of line 304 between Figures are indicated by "C"). The source of this voltage will be further described below. Due to the standard circuit construction of follower 220, well known to those of ordinary skill in the art, a detailed description of its operation is not necessary. It is sufficient to state for this description that follower 220 is able to source current through resistor 215 to junction 214, as demanded from the circuit comprising elements 200-214, from an output terminal 221 at an output voltage equal to its input voltage from line 304 at input terminal 222.

The voltage at junction 214 is applied via line 306 (the connections of line 306 between Figures are indicated by "D"), traceable through FIG. 6B, to the input 281 of another voltage follower 280 in FIG. 6C, which corresponds to voltage follower 88 in the circuit of FIG. 3. The same voltage is thus provided from the output 282 of follower 280 to the base of an NPN bipolar transistor 260 having a grounded emitter and a collector connected through a PNP bipolar transistor 263 and a resistor 264 to the positive supply 300. Transistor 260 corresponds in function to transistor 90 in the circuit of FIG. 3 and to the exponential voltage/current converter shown in FIG. 2. A PNP bipolar transistor 265 connects the collector and base of transistor 263; and transistor 263 thus forms a current mirror with PNP bipolar transistor 266, which has an emitter connected through a resistor 267 to the positive voltage supply 300 and an emitter connected to an output terminal 270. Transistor 266 provides a collector current to output terminal 270 that is equal to the collector current of transistor 260 and thus representing the duty cycle of the input signal, to output terminal 270. This current is applied as current $I_{IN}$ to oscillator 100.

Returning to FIG. 6B, The voltage provided on line 304 to follower 220 of FIG. 6A is generated as follows in this embodiment. A PNP bipolar transistor 230 has an emitter connected through a resistor 231 to the positive supply 300 and a collector connected to the base of an NPN transistor 232 having a collector connected to the positive supply 300 and an emitter connected through a resistor 233 to ground. The collector of transistor 230 is also connected to the base of an NPN bipolar transistor 235 having a collector connected to the positive supply 300. An NPN bipolar transistor 236 has a collector connected to the collector of transistor 230 and a grounded emitter. The emitter of transistor 235 and the base of transistor 236 are connected together and through a resistor 237 to ground. In operation, transistor 230 is essentially one of the outputs of reference current generator 245 and corresponds to current source 80 in the circuit of FIG. 3. It provides current $I_{REF}$ from its collector through transistor 236 to ground. Transistor 236, with its collector and base connected through transistor 235, corresponds to Vbe generator 82 of FIG. 3. Its base is one Vbe above ground, and this base voltage is raised by one Vbe in transistor 235 and then lowered by one Vbe in transistor 232 to the output on line 304. Thus, the circuit comprising elements 230-237 provides a Vbe reference voltage based on the reference current sourced from transistor 230; and these elements together with reference current generator 245 and follower 220 comprise a reference base-emitter voltage generator corresponding to elements 80, 82 and 84 of FIG. 3. This reference voltage is applied to one end of resistor 215 in FIG. 6A; the difference current $I_{PER}-I_{ON}$ through resistor 215 generates voltage $V_N$ on line 306 as previously described with reference to the circuit of FIG. 3; and line 306 provides voltage $V_N$ through follower 280 in FIG. 6C to the base of transistor 260, wherein it is exponentially converted to a collector current representing the duty cycle of the input signal and mirrored to output terminal 270 for application to oscillator 100.

A linearizing feedback is also provided in the circuit of FIG. 6A-6C. The base of transistor 263 in FIG. 6C is also connected through line 308 (the connections of line 304 between Figures are indicated by "E") to the base of a PNP bipolar transistor 242, shown in FIG. 6B. Transistor 242 has an emitter connected through resistor 243 to the positive supply 300 and thus also forms a current mirror with transistor 263 to provide a collector current equal to the output current of the ASIC (terminal 270) to diode-connected NPN bipolar transistor 241 forming a current mirror with another NPN bipolar transistor 240. The collector of transistor 240 is connected to the collector of transistor 230 and acts as a variable current sink that draws collector current from transistor 230 that would otherwise flow through transistor 236. It reduces the Vbe reference voltage provided to line 304 as the output current from resistor 263 increases due to an increase in current through the exponential voltage/current converter transistor 260 and thus provides capability of improving the mathematical accuracy of the circuit in determining the duty cycle of the input signal.

The circuit of FIGS. 6A-6C also includes a reference current generator 245, shown in FIG. 6B, that provides a common reference current for the circuit to make it independent of changes in supply voltage. It should be noted that many such current generator circuits are known to those of ordinary skill in the art, and any suitable circuit may be used. This reference current is applied via line 302 (the connections of line 302 between Figures are indicated by "B") to the followers 220 and 280, as well as the Vbe reference generating circuit of elements 230-237. Although many such circuits are known in the art, a brief description of a portion of this circuit is given. An NPN bipolar transistor 246 has an emitter connected through a resistor 256 to ground and a collector connected through an NPN bipolar transistor 247 in series with a PNP bipolar transistor 248 and a resistor 249 to the positive supply 300. Transistor 246 has a larger emitter area—for example three times larger—than that of transistor 247. A PNP bipolar transistor 250 has its emitter connected to the base of transistor 248, its base connected to the collector of transistor 248 and a grounded collector.

An NPN bipolar transistor 251 has a grounded emitter; and the base of each of transistors 246 and 251 is connected to the collector of the other. The collector of transistor 251 is also connected to the emitter of an NPN bipolar transistor 252 having a base connected to its collector and to the base of transistor 247. Transistor 252 has a larger emitter area—for example three times larger—than that of transistor 251. The collector of transistor 252 is connected in series through a diode-connected NPN transistor 253, a collector and emitter of a PNP bipolar transistor 254 and a resistor 255 to the positive supply 300. In addition, a PNP transistor 297 has an emitter connected through a resistor 298 to positive power supply 300, a base connected to line 302 and a collector connected to a terminal 299, which is connected to an input of oscillator 100.

As one traces the circuit from ground upward through the base-emitter junction of transistor 251 and then the base-emitter junction of transistor 247, the bases of transistors 247 and 252 are two series IX Vbe voltage drops above ground. Tracing the circuit downward again through the base-emitter junction of transistor 252 and the base-emitter junction of transistor 246, there are two series 3×Vbe voltage drops down to the emitter of transistor 246, which is at a voltage above ground that appears as a drop across resistor 256. The current flowing through resistor 256, transistors 246, 247 and 248 and resistor 249 in series establishes a reference voltage on line 302 and similarly biases the PNP transistors having bases connected thereto to provide the reference current $I_{REF}$. Each of these PNP transistors (230, 254, 297 and the un-numbered similar transistors in followers 220 and 280) have identical emitter areas and are connected to the positive supply 300 through identical resistors 231, 255, 298, etc. In particular, transistor 230 provides the reference current $I_{REF}$ to the reference Vbe generating transistor 236, which corresponds to Vbe generator 82 of FIG. 3; and transistor 297 provides the reference current $I_{REF}$ to oscillator 100 (corresponding to $I_{REF}$ current generator 104 of FIG. 4). Thus, the remainder of the circuitry powered through these PNP transistors is controlled in a ratiometric manner.

Some additional elements shown in the block labelled reference current generator 245. Resistor 290 permits adjustment of the operating point of PNP transistor 250 that sinks the base current of the current source transistors (230, 248, 254, etc.) having bases connected to line 302. Elements 291 to 294 provide a start-up circuit for reference current generator 245, to ensure that it does not remain in a zero current state when electric power is first applied. Diode-connected NPN transistor 292 has a collector and base connected through resistor 291 to the positive voltage supply 300 and an emitter connected to the emitter of NPN transistor 253 and the collector of diode-connected NPN transistor 252. The base of transistor 292 is further connected to the collector of an NPN transistor 293 having a grounded emitter and a base connected through a resistor 294 to ground and also to the collector of PNP transistor 254 that is not connected to the collector of transistor 253. In operation, diode-connected transistor 292 provides initial current (if required) to the lower transistors 246, 247, 251 and 252 upon initial application of power to the circuit. Once the main circuit has started conducting, transistor 293 turns on to reverse bias diode-connected transistor 292 so that it does further affect the operation of the circuit.

The invention claimed is:

1. An analog duty cycle replicating frequency converter for pulse width modulated signals comprising:
    an input for receiving an input signal having an electrical characteristic varying at a first frequency between a first pair of values with a variable duty cycle;
    a first time/voltage converter providing an output voltage representing a portion of a period of the input signal in which the electrical characteristic has a predetermined one of the two values;
    a first voltage responsive logarithmic current source coupled to receive the output voltage of the first time/voltage converter and provide a first current representing a logarithm of the portion of a period of the input signal in which the electrical characteristic has the predetermined one of the two values;
    a second time/voltage converter providing an output voltage representing the period of the input signal;
    a second voltage responsive logarithmic current source coupled to receive the output voltage of the second time/voltage converter and provide a second current representing a logarithm of the period of the input signal;
    a current difference responsive voltage source coupled to the first and second voltage responsive logarithmic current sources and adapted to generate an output voltage representing a difference between the first and second currents and thus a logarithm of the duty cycle of the input signal;
    an exponential voltage/current converter coupled to receive the output voltage of the current difference responsive voltage source and generate a third current exponentially derived therefrom and thus representing the duty cycle of the input signal; and
    an oscillator responsive to the third current to generate an output signal having an electrical characteristic varying at a second frequency between a second pair of values with the duty cycle of the input signal.

2. The analog duty cycle replicating frequency converter of claim 1 wherein the electrical characteristic is a voltage.

3. The analog duty cycle replicating frequency converter of claim 1 wherein the second frequency is greater than the first frequency.

4. The analog duty cycle replicating frequency converter of claim 1 wherein the current difference responsive voltage source comprises:
    a current difference circuit, coupled to the first and second voltage responsive logarithmic current sources and adapted to generate a difference current representing a difference between the first and second currents; and
    a linear current/voltage converter responsive to the difference current to provide a voltage proportional to the difference current.

5. The analog duty cycle replicating frequency converter of claim 4 wherein the linear current/voltage converter comprises a resistor carrying the difference current and generating a voltage drop.

6. The analog duty cycle replicating frequency converter of claim 5 wherein the current difference responsive voltage source further comprises a reference base-emitter voltage generator connected to an output of the current difference responsive voltage source through the resistor such that the output voltage of the current difference responsive voltage source is a difference between an output voltage of the reference base-emitter voltage generator and the voltage drop generated by the resistor.

7. The analog duty cycle replicating frequency converter of claim 6 wherein the reference base-emitter voltage generator comprises a reference current generator adapted to bias a fourth bipolar transistor to provide the reference base-emitter voltage across its base-emitter junction.

8. The analog duty cycle replicating frequency converter of claim 7 wherein the reference base-emitter voltage generator further comprises a variable current sink connected to the reference current generator and responsive to the third current to take an increasing portion of the current from the reference current generator to change the biasing of the fourth bipolar transistor as the third current increases and thus provide linearizing feedback.

9. The analog duty cycle replicating frequency converter of claim 7 wherein the oscillator comprises:
    a voltage ramp generator providing a repeating ramp voltage;
    a first reference voltage generator generating a first reference voltage responsive to the third current;
    a first comparator effective to end the on-time of the generated output signal by comparing the ramp voltage to the first reference voltage;
    a second reference voltage generator generating a second reference voltage responsive to the reference current; and
    a second comparator effective to end the period of the generated output signal by comparing the ramp voltage to the second reference voltage.

10. The analog duty cycle replicating frequency converter of claim 4 wherein the current difference circuit comprises:
    a first conductor carrying the first current;
    a second conductor connected at a node in series with the first conductor and carrying the second current;
    a third conductor connected to the node in series with the second conductor and carrying a difference current equal to the difference between the second and first currents.

11. The analog duty cycle replicating frequency converter of claim 10 wherein the third conductor includes a resistor carrying substantially all the difference current and generating a measurable voltage drop linearly related thereto.

12. The analog duty cycle replicating frequency converter of claim 11 wherein the current difference responsive voltage source further comprises a reference base-emitter voltage generator connected to an output of the current difference responsive voltage source through the resistor such that the output voltage of the current difference responsive voltage source is a difference between the output of the reference base-emitter voltage source and the voltage drop generated by the resistor.

13. The analog duty cycle replicating frequency converter of claim 1 wherein at least one of the first voltage responsive logarithmic current source and the second voltage responsive logarithmic current source comprises a first bipolar transistor having a collector and a base/emitter junction, the first bipolar transistor being adapted to establish a voltage across the base-emitter junction thereof as a logarithmic function of a current established in the collector thereof.

14. The analog duty cycle replicating frequency converter of claim 13 wherein the one of the first voltage responsive logarithmic current source and the second voltage responsive logarithmic current source further comprises a second bipolar transistor having a base coupled to receive the output voltage of the corresponding one of the first time/voltage converter and the second time/voltage converter and a collector connected in series with the collector of the one of the first bipolar transistor and the second bipolar transistor to establish the current in the collector thereof as a linear function of the output voltage of the corresponding one of the first time/voltage current converter and the second time/voltage converter.

15. The analog duty cycle replicating frequency converter of claim 14 wherein the one of the first voltage responsive logarithmic current source and the second voltage responsive logarithmic current source further comprises a resistor connected across the base-emitter junction of the first bipolar transistor and a conductor connected in series with the resistor to provide an output current that is a logarithmic function of the collector of the first bipolar transistor.

16. The analog duty cycle replicating frequency converter of claim 1 wherein the exponential voltage/current converter comprises a third bipolar transistor adapted to provide an exponential conversion between an input voltage imposed across the base-emitter junction thereof and an output current generated in a collector thereof.

* * * * *